United States Patent [19]
Barzegar et al.

[11] Patent Number: 5,642,348
[45] Date of Patent: Jun. 24, 1997

[54] ACCESS DIRECTOR INTERFACE FOR NARROWBAND/BROADBAND INFORMATION DISTRIBUTION NETWORK

[75] Inventors: Farhad Barzegar, Hillsborough Township, Somerset County; Diakoumis P. Gerakoulis, Dover; Robert Raymond Miller, II, Morris Township, Morris County; Yuan-Rong Shen, East Hanover, all of N.J.

[73] Assignee: Lucent Technologies Inc., Murray Hill, N.J.

[21] Appl. No.: 367,419

[22] Filed: Dec. 30, 1994

[51] Int. Cl.$^6$ .................. H04B 7/216; H04J 13/02
[52] U.S. Cl. .................. 370/277; 348/13; 379/63; 370/342; 370/441; 370/522
[58] Field of Search .................. 370/18, 24, 29, 370/58.1, 58.2, 58.3, 68.1, 79, 85.1, 85.13, 94.3, 95.1, 95.3, 110.1, 118; 375/200, 205; 348/6, 12, 13, 14; 379/58, 59, 60, 61, 63, 268, 269; 455/3.1, 5.1, 6.1, 33.1, 33.2, 34.1, 53.1, 54.1, 56.1

[56] References Cited

U.S. PATENT DOCUMENTS

| | | | |
|---|---|---|---|
| 5,228,026 | 7/1993 | Albrow et al. | 370/29 |
| 5,247,702 | 9/1993 | Su et al. | 379/63 |
| 5,267,244 | 11/1993 | Messerschmitt et al. | 370/18 |
| 5,363,404 | 11/1994 | Kotzin et al. | 375/205 |
| 5,398,258 | 3/1995 | Su et al. | 375/200 |
| 5,434,854 | 7/1995 | Focarile et al. | 455/33.1 |
| 5,438,565 | 8/1995 | Hemmady et al. | 370/18 |

*Primary Examiner*—Alpus H. Hsu
*Attorney, Agent, or Firm*—Alfred G. Steinmetz

[57] ABSTRACT

An access director provides a gateway for customer premise based equipment (both wired and wireless) and a wireless port facility to a narrowband/broadband information distribution network. It provides a portable narrowband duplex synchronous and isochronous telephony service and concurrent broad fixed location dodwn link from network to customer isochronous service. The down link broadband service may be combined with narrowband up link service to provide non-symmetric duplex operation or services such as interactive video.

16 Claims, 8 Drawing Sheets

5,642,348

1

ACCESS DIRECTOR INTERFACE FOR NARROWBAND/BROADBAND INFORMATION DISTRIBUTION NETWORK

FIELD OF THE INVENTION

This invention relates to a narrowband/broadband information distribution network for the delivery of telephony data, and video services to a customers premises. It is particularly concerned with system interface and termination hardware and firmware to provide an interface between customer premises equipment and a wireless port facility provided as a gateway to the narrow band/broadband information distribution network.

BACKGROUND OF THE INVENTION

The rebroadcast of a broadcast wireless signal to a localized area is degraded by the effects of multipathing on the signals. The rebroadcast signal may be retransmitted at a different frequency than the original broadcast signal to compensate for the multipathing effect but this change in frequency complicates the communication process and limits the flexibility to provide varying services. Such services may require differing bandwidths and changing frequencies of transmission from the original to the rebroadcast. With these required changes in frequency for rebroadcast, the use of the frequency band becomes highly inefficient.

SUMMARY OF THE INVENTION

An access director provides a gateway for customer premises based equipment (both wired and wireless) and a wireless port facility for a narrowband/broadband information distrbution network. It provides potable narrowband duplex synchronous and isochronous telephony service and a concurrent broadband fixed location downlink from network to customer isochronous service. The downlink broadband service may be combined with narrowband uplink service to provide non-symmetric duplex operation for broadband services such as interactive video.

The access director transmits and receives wireless radio signals, operates as a repeater for wireless ISDN telephone service, provides an interface to a wired connection to broadband information service equipment, provides an interface to conventional ISDN and Tip/Ring distribution wiring and provides user services such as service profile mangement, privacy fraud protection and specialized operating systems. Frequency bands in such a system are dynamically paritioned for providing the various narrow and broadband services.

In a particular embodiment CDMA modulation techniques are utilized for signals being supplied from an antenna for distribution and repeated by the access director as the same CDMA modulated signal within customer premises for wireless access. Wireless communicators may receive the same CDMA signal from the access director and also from the antenna or microport of the overall distribution system without any conversion of operation of the wireless communicator being required. This utilizes the CDMA modulation ability to minimize multipath interference and allows the wireless communicator to select transmissions from either the access director or microport source based on the quality/power of the received signal.

In another aspect of the invention, circuitry is provided to emulate a wired connection to the network to enable fully functioning ISDN service to be provided to the end user who is really connected by a wireless connection to the network. In particular the circuitry provides a circulating data stream to enable a wireless connected ISDN terminal to function in the same manner as a wired ISDN.

DETAILED DESCRIPTION

Figure 1:
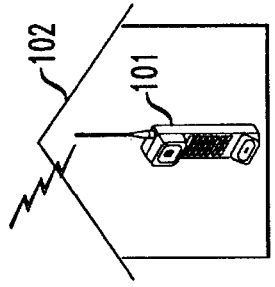
FIG. 1 is a pictorial view of a mounted access director unit.

The physical realization of the access director 101 shown in the FIG. 1 is mounted to the external wall of a building 102. Contained within the access director is radio circuitry and antennas for receiving and radiating wireless/radio signals. The access director may be mounted on a gimbaled mount (not shown) so that the gain of the antennas may be optimized by appropriate tilting of the included antennas.

Figure 2:
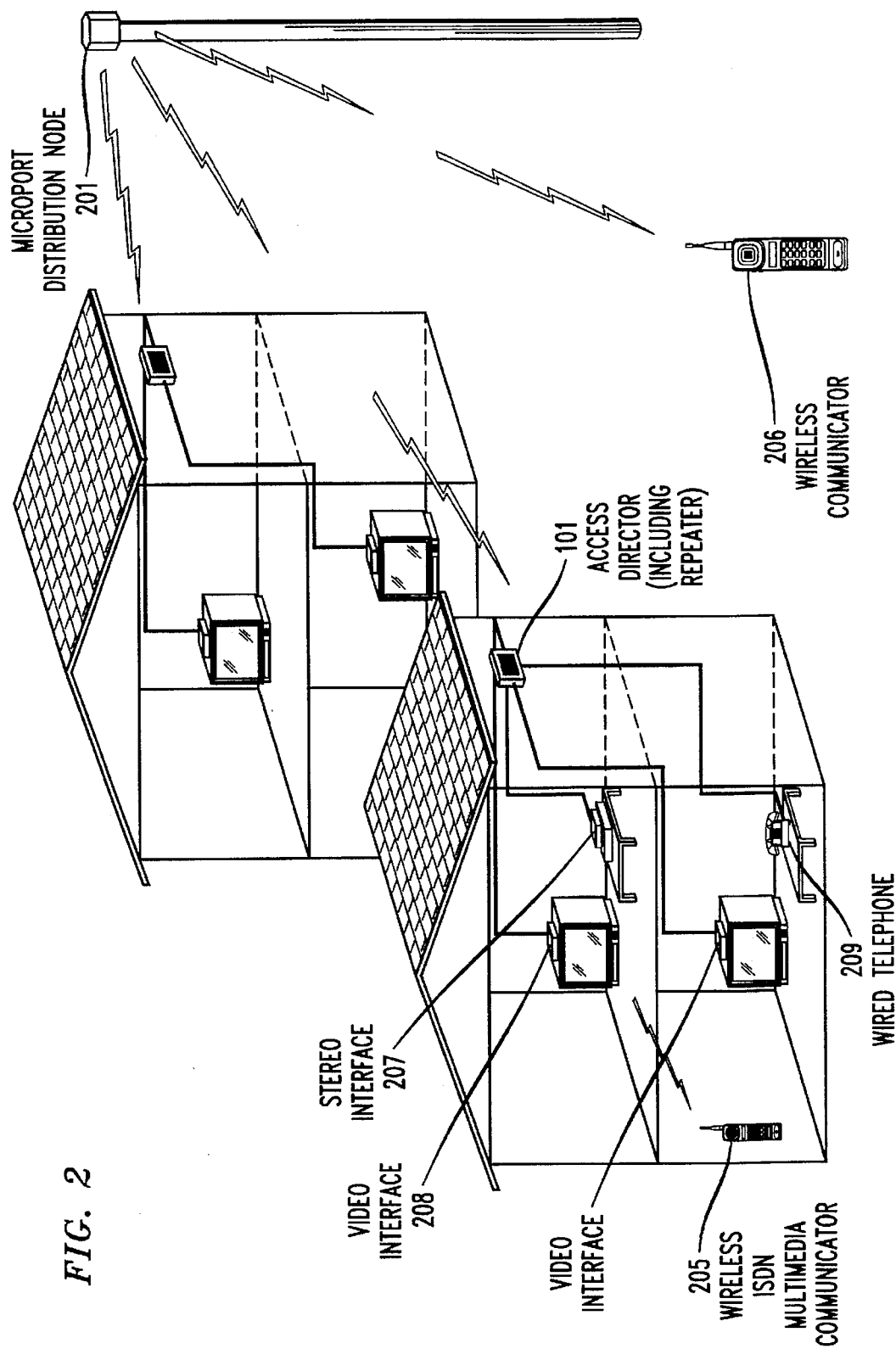
FIG. 2 is a pictorial schematic of a typical application environment served by the access director.

A typical user setting for the access director 101 is shown in the FIG. 2 where the access director 101 is shown in radio communication with a radiant antenna or microport distribution node 201 which is in turn connected by wire to a communication network. The microport distribution node 201 allows access to a wide area communication network that provides a variety of services with required bandwidth supplied on demand. A communication network suitable for communication with the access director is disclosed in the patent application Ser. No. 08/361,355 filed Dec. 21, 1994, now U.S. Pat. No. 5,592,470. A microport distribution node is disclosed in the patent application Ser. No. 08/367,402 filed Dec. 30, 1994, now U.S. Pat. No. 5,574,966.

The access director 101 is connected by wiring both copper and cable to a variety of customer equipment devices including a stereo interface 207, a video interface 208 and a wired telephone 209. In addition to the wired devices the access director 101 communicates through a wireless repeater circuit with a CDMA modulated signal to a personal wireless communicator 205 within the house. The microport distribution node also communicates with an identical CDMA modulated signal to a personal wireless communicator 206 situated to communicate directly microport node 201.

Figure 3:
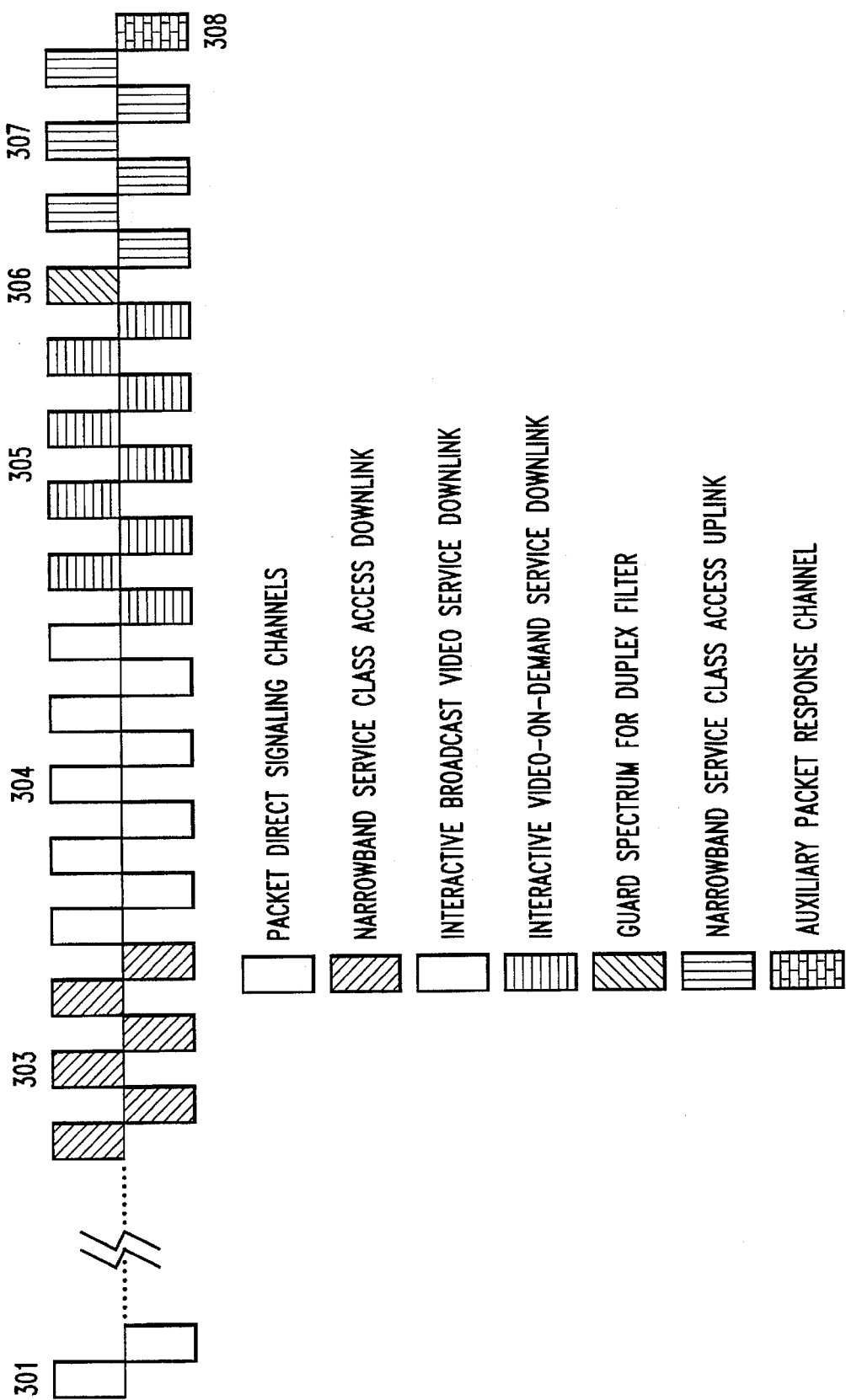
FIG. 3 is a block distribution graph of access band spectra partitioning for channel allocations.

Since the various services require differing bandwidths, an illustrative possible choice of suitable spectrum for the composing of appropriate channels must be found from available spectra. Possible available spectra are graphically blocked out in the FIG. 3. The frequency chart of FIG. 3 depicts a possible frequency partitioning plan to provide a variety of wideband and narrowband services. In the illustrative embodiment the narrowband transmission channels support simultaneous duplex operation and the wideband transmission channels are providing one way downlink isochronous communication. A typical narrowband service includes ISDN multimedia and a typical wideband service includes interactive video services with a wideband downlink video signal and an associated narrowband uplink control channel to provide non-symmetric duplex operation.

The service channel map of FIG. 3 shows how various channels may be apportioned to various illustrative service classes. Blocks of channels each enabling a 6 or 10 MHz bandwidth are shown arranged linearly. Two channels 301 are shown distinct and isolated from the main array. These channels are dedicated to signaling for set up of connections and control of interactive commands. They also convey data useful in provisioning, billing/OAM&P, (operations, administration, maintenance, and provisioning), and maintaining services to end users on an end-to-end basis across all services in an integrated manner. This data communicated to the end user also includes user identity, destination address, authentication service request codes, billing options, OAM&P messages, security/encryption code, service priority, location, grades of service requested, etc. This data is used by the network servers to provide services to end users in accordance with service requests. Channels 301 are wireless packet signaling channels in this embodiment and are comprised of two 6 MHz channels. In addition to utilizing channel 301, channel 308 (auxiliary packet response channel) could be used for these signaling and control messages, based on the amount that such messages need to be supported. Finally, in addition to the dedicated channels (301,308) these messages could also be exchanged via the same channels (303–307) used for the bearer services.

The total array of bearer channels covers a span of 198 MHz in this illustrative array. Channels 303 are narrowband service class access downlink channels. Channels 304 are downlink broadcast video service channels. Channels 305 are downlink interactive video on demand channels. The channels designated 306 provide guard spectrum for duplex filters/attenuation rolloff used in the network. Channels 307 are uplink narrowband service class access channels. Channel 308 is an auxiliary packet response channel. In the illustrative embodiment, channels designated 301 are bounded between 2150 MHz and 2162 MHz, and channels designated 303 through 308 are bounded between 2500 MHz and 2690 MHz. In this embodiment, both the frequencies and the bandwidth of the channels can be adapted to meet different requirements.

Figure 4:
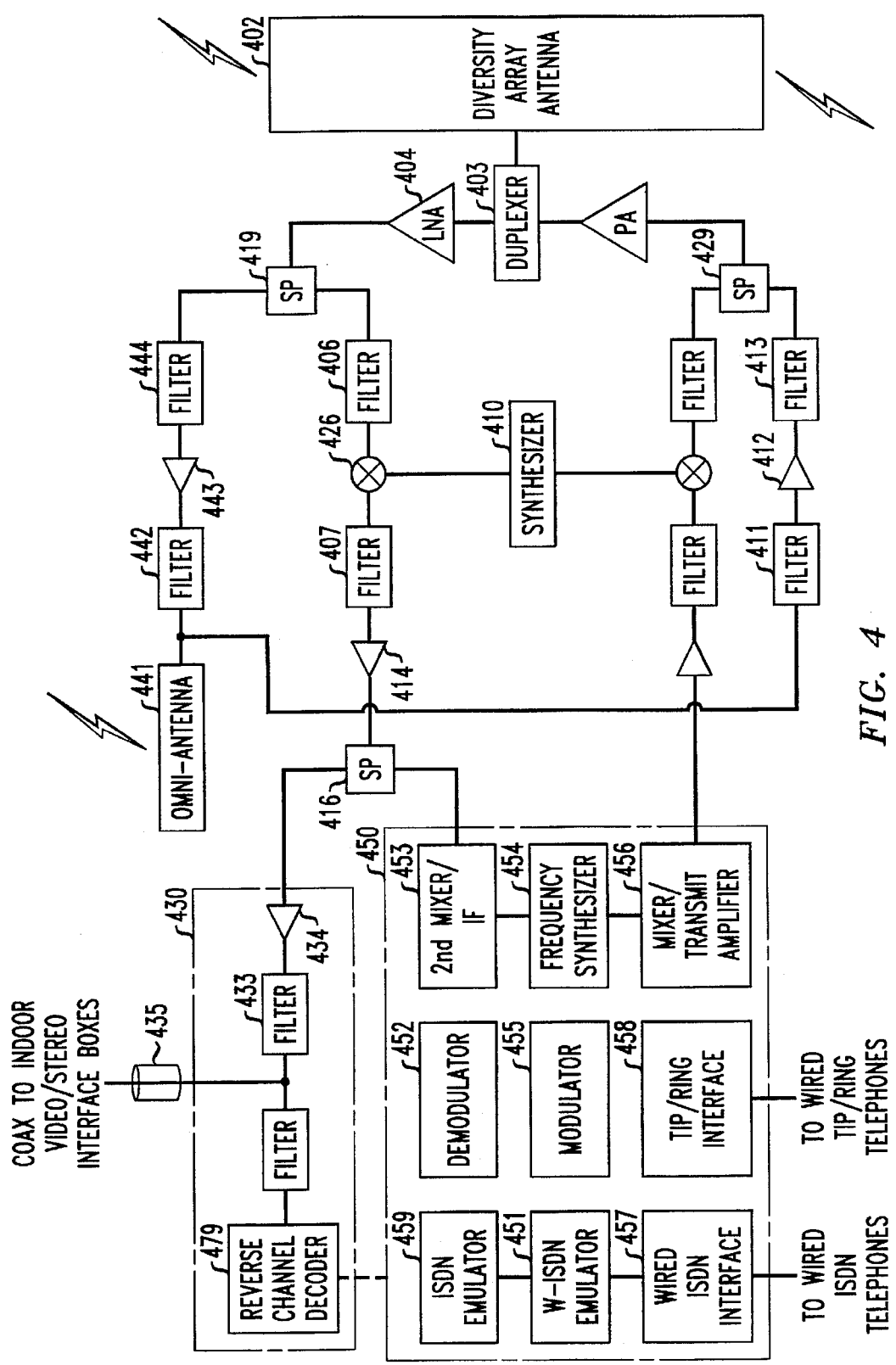
FIG. 4 is a block schematic of the equipment and components comprising the access director.

A block diagram of the access director as shown in the schematic of FIG. 4 includes a high gain directive array antenna 402 for facilitating wireless communication between a microport antenna of the communication network and the access director. Incoming and outgoing RF signals are processed by a duplex (power separation) filter 403 which allows the access director to use the antenna for both reception and transmission of RF signals. The downlink connection of the duplex filter 403 is connected to a low noise amplifier (LNA) 504. An output of the LNA 404 is connected to a splitter circuit 419 which directs half the received RF power comprising downlink CDMA signals to a filter circuit 444, a subsequent RF buffer amplifier 443 and a subsequent filter 442 tuned to downlink CDMA receive frequencies. Filter 442 is connected to an omnidirectional antenna 441 for communication with local wireless communication units omnidirectional antenna 441 is carefully physically situated in the null of the omnidirectional antenna pattern to minimize any interference from the microport antenna and the high gain directive array antenna 402.

The omnidirectional antenna reradiates the CDMA signal received at the directive array antenna 402 to the local mobile communicator units within its range. The gain provided by the directional array antenna and the LNA 404 enables the radiated CDMA signal to be an accurate phase delayed version of the RF signal radiated by the microport antenna. The composite microport and access director signals appear as a single signal with multipath arrivals one of which is strong due to proximity to the microport or access director. The most appropriate personal communicator receiver, for this application, is a RAKE receiver. The RAKE receiver is one particularly suited for operating in a multipath signal arrival and fading environment. Details of the design of such RAKE receivers are well known in the art and are not a part of this application. An advantage of the RAKE receiver and associated communications is the significant reduction of power requirements which in the case of needed power reduces the drain of any batteries in the system.

Signals received from the personal communicators are detected by the omnidirectional antenna 441 and communicated via filters 411,413, amplifier 412, splitter 429 and the uplink portion of duplex filter 403 to the directional array antenna 402 which radiates the uplink RF signal to the microport antenna of the communication network.

The output of the LNA 404 is also connected via the splitter 419 to a downlink filter 406 and to the mixer 426 which has the frequency of the local oscillator or frequency synthesizer 410 input applied thereto to generate a signal having a frequency suitable for coaxial cable distribution. The mixer output is filtered in filter 407 and the output amplified by a buffer amplifier 414. The output of the amplifier 414 is applied to a signal splitter 416 and a portion of the signal is applied to a coax interface 430. The signal is amplified by a coaxial driver amplifier 434 and filtered by a filter 433 and applied to a coax cable 435 which may be connected to a local digital video decoder, a high speed computer interface, cable stereo equipment or other applications requiring high bandwidth signals. CDMA downlink signals may be coupled to the coax to permit ISDN D channel packets to communicate with a set-top box of the video or stereo.

The splitter 416 in addition supplies an RF signal to a wireless ISDN to wired telephone converter 450. The converter includes a transceiver for the CDMA uplink and downlink channels including a second mixer/IF 453 for downlink signals and a mixer/transmit amplifier 456 for uplink signals. Both units are connected to a frequency synthesizer 454 for supplying a local oscillator frequency. The demodulator 452 and the modulator 455 are designed for wideband CDMA signals and the demodulator is implemented using a RAKE structure and a means for generating a CDMA signal from baseband digital information.

Detected digital information is processed by the W_ISDN processor 451 which constitutes a computer programmed to decode the formatted bit stream to produce reconstituted ISDN B and D channels. A surrogate emulator circuit 459, coupled to the processor 451, is included to provide surrogate signals to emulate a wired connection of the ISDN phone to the network. It includes a digital signal processor (DSP) which is programmed to provide a data stream to the ISDN phone to emulate the wired connection and render the ISDN phone operative.

The bit timing for the data stream is derived from a timing reference that is transmitted over the radio link in the downlink direction via the pilot and synchronization channels. When the traffic channel is established the ISDN frame timing produced by the NT and TE emulators is itself synchronized via buffers controlled by the wireless ISDN processors in the microport and access director.

In the illustrative arrangement up to two wireless channels can be aggregated with one wireless D channel to provide 144 Kb/s duplex isochronous through put directly into a wired ISDN standard Basic Rate Interface (BRI) 457, which is enabled by the network termination (NT) emulator 459. The hardware interface 457 is implemented by use of a microcomputer based protocol manager in conjunction with a BRI line interface IC. With the addition of multiple wireless ISDN-to-wired telephone converter modules, additional B channels may be added to a total of 6B channels (384 Kb/s).

A tip/ring interface 458 uses commercial analog telephone interface ICs such as a PBX line card. This interface handles touch-tone dialing, supervision, ringing, etc. with appropriate ISDN control sequences.

The wireless ISDN-to-wired telephone converter processor 451 includes an interactive executive operating system which may be accessed by the coax interface and its reverse channel decoder to provide wideband and narrowband system customization to the coax system (i.e., turn off incoming telephone calls). This allows the user equipment connected to the coax to communicate with the W-ISDN processor for purposes of interactive TV or network connections.

Figure 5:
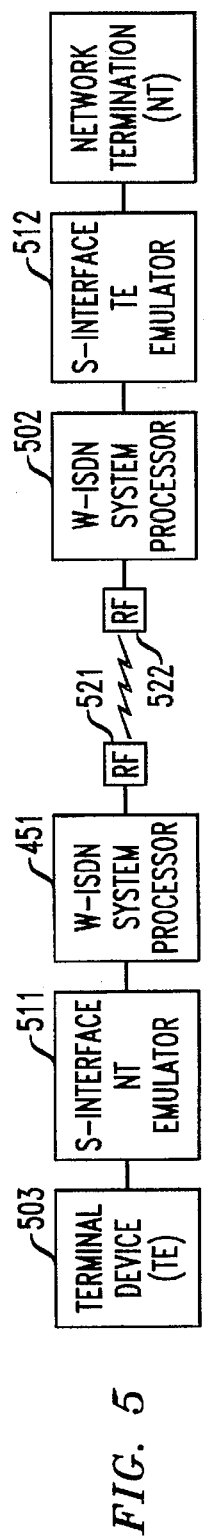
FIG. 5 is a block schematic of a system arrangement to provide ISDN services over a wireless link.

The ISDN telephone normally requires a wired connection for proper functioning since a circulating stream of data is required to enable call initiation and call receipt and the functioning of other related features. In the case of a wireless connection such as disclosed herein this difficulty is overcome by the devising of a surrogate interface between the wireless access and the wired interface with the ISDN end terminal equipment. An example of such an arrangement is shown in the illustrative functional block diagram of FIG. 5. The terminal end and network terminal are connected by radio by the RF circuitry 521 and 522. The example shown illustrates two W-ISDN system processors 451 and 502 located at the customer premises and at the terminal end of the network, respectively. The ISDN terminal is connected to the S-interface (NT) emulator 511 which is in turn connected to the system processor NT 451. The emulator 511 provides a data stream to emulate a wired connection to the customer premises W-ISDN processor 451. The S-interface N+511 is in turn connected to the network via ISDN system processor 502 and the TE emulator 512. The W-ISDN system processors 451 and 502 are each located subsequent to each radio transceiver 521 522, which serve as the wireless communicating devices joining the customer premises to the network, via the radio air waves, respectively. These surrogate sources provide the circulating data stream to replace the data stream that normally flows over the wired connection between the network and the end ISDN terminal and which enables the customer ISDN terminal to make and receive calls. Similarly the ISDN terminal at the central office of the network must also receive a continuous stream of digital information from the customer ISDN terminal. Should the continuous stream be interrupted, the network will declare a fault. Such a continuous stream of information is not desirable in a system coupled by radio communication since it wastes radio spectrum and limits frequency reuse thereby limiting overall capacity.

The S-interface emulator 511 provides the necessary data stream to enable ISDN operation over the wireless connection. The surrogate unit 459 is included in the access director of FIG. 4 and shown connected to the W-ISDN processor 451. The wireless station of the network contains a similar S-emulator interface 502 interposed between the wired network and the wireless radio port.

The ISDN phone must be synchronized with the system since it is not an asynchronous device. A synchronizing signal, is continuously transmitted by the CDMA channel from the network to time synchronize with the CDMA system to time synchronize with the CDMA system. This is sent from the network to the customer premises circuitry. This is followed by signaling over the access channel and subsequent set up of the traffic channel. The emulation data stream is used during the idle period to sustain the illusion of a wired connection.

The processing of the S-interface NT emulator, in the access director, is shown in FIG. 6. The emulator provides a surrogate circulating data stream normally present in a wired system. The process shown in FIG. 6A begins in the terminal 601 which initializes the ISDN chip of the receiving system to adapt to a simulated network terminal (NT) mode. Following acquisition of the pilot and synchronization wireless CDMA or ISDN channels the recovered timing reference initializes the bit clock of the ISDN chip. Following this its buffers are initialized to contain the serial I/O data as SIO-1 and SIO-2 representing data streams normally appearing between the network emulator and ISDN phone and between the network termination NT and the terminal end TE over the traffic channel. The DSP is initialized from the ISDN chip buffer with interrupts representing the SIO-1 and SIO-2 data in response to interrupts supplied by the ISDN chip. The flow of FIG. 6A then waits for interrupts. The interrupt for an SIO-1 input to the ISDN phone is shown in the FIG. 6B where the interrupt appears at the terminal 611. The data is received from the ISDN switch in block 612 and the data is input into the DSP in block 613. The C channel of the C data block is replaced by all Zeros to form the desired data queue in block 614 and the return terminal 615 is reached.

Figure 6A:
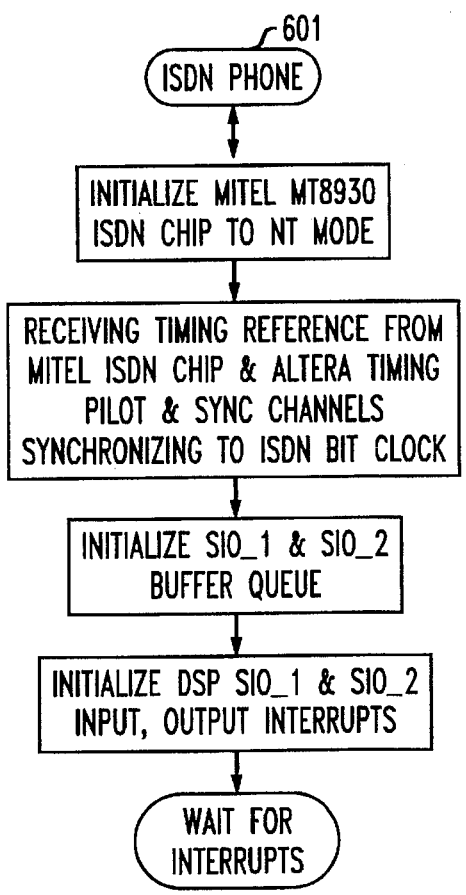
FIGS. 6A, 6B, 6C, 6D, and 6E show flowcharts of the emulator process at the customer premises to emulate a wired ISDN connection.
Figure 6B:
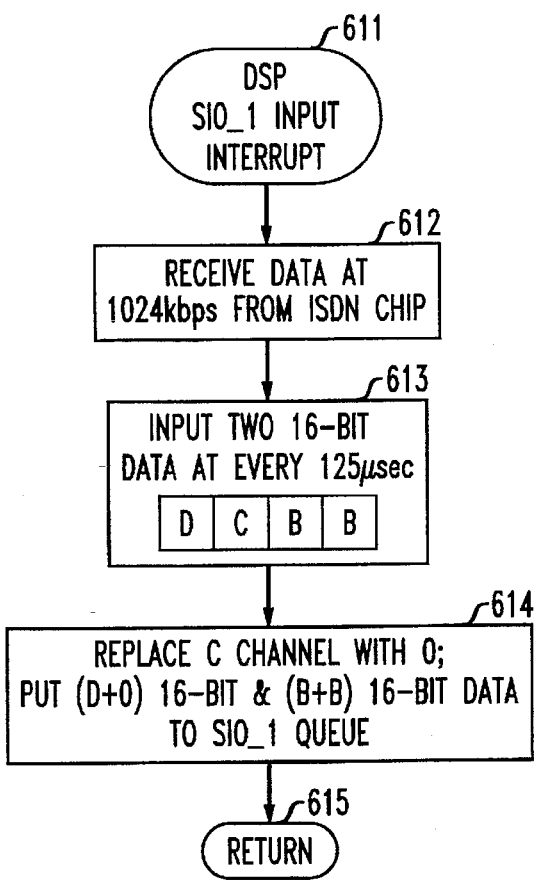
Figure 6C:
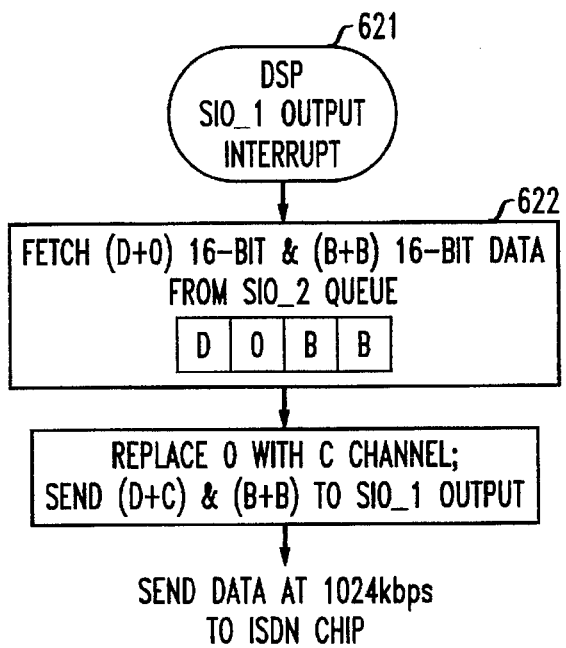

The process of an SIO-1 output interrupt is shown in the FIG. 6C and beginning in terminal 621. In block 622 the SIO-2 data queue is retrieved from the SIO-2 queue and the C channel data replaces the Zero value. This altered data is sent to the ISDN chip.

Figure 6D:
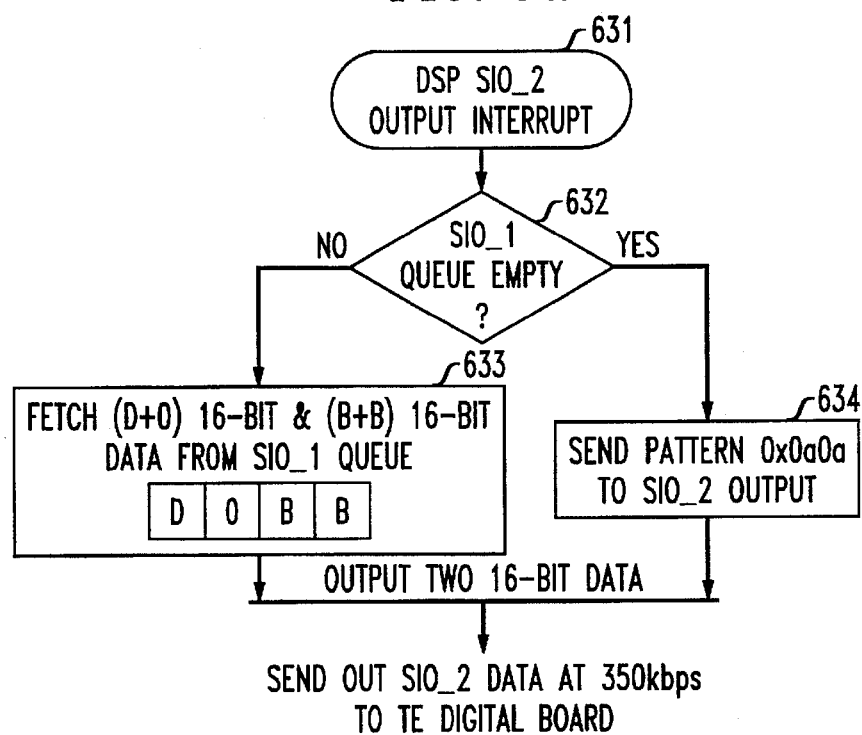
Figure 6E:
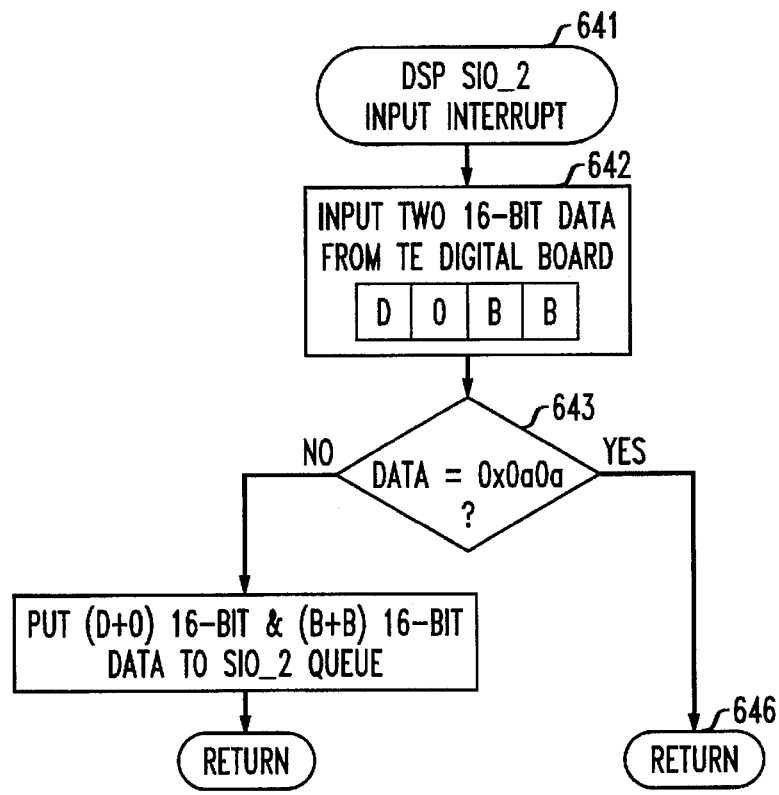

The process related to an SIO-2 output interrupt is shown in the flow of FIG. 6D and starts in terminal 631 with the DSP supplied SIO-2 output interrupt. The SIO-1 queue is monitored and determined if it is empty. If it is not the block 623 indicates the fetching of data from the SIO-1 queue and if it is the block 624 indicates supplying a zero data pattern to the SIO-2 output this data is in either case output as SIO-2 data. In the case of a SIO-2 input interrupt, as shown in FIG. 6E, the flow starts in terminal 641 and pseudodata is input from the TIE digital board on which the DSP is mounted. IT is determined if this data is zero in block 643 and if it is not the zero data is placed in the SIO-2 queue. This is followed by a return. A determination of the data being zero leads to the return of terminal 646.

Figure 7:
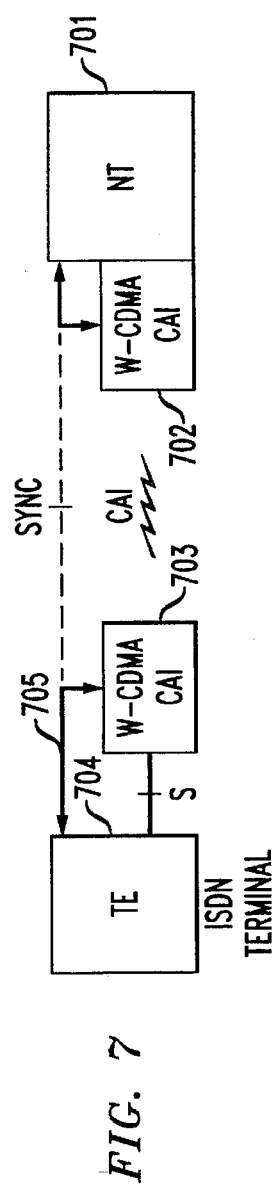
FIG. 7 is a block diagram of a wireless interface between a customer premises and ISDN terminals.

A mobile ISDN terminal also requires a separate independent emulator. A block diagram of a wireless interface between a customer premises and ISDN terminals is shown in the FIG. 7. The terminal end of the system network ends in a network termination 701 which provides the terminal equipment emulation to the network. A wireless CDMA coder and transceiver 702 is interactively connected to the network termination and radiates to and receives from the customer premises CDMA encoded signals.

A CDMA terminal 703 at the customer premises is connected by a switch "S" to the terminal end ISDN terminal 704 and in a functional way via connection 705. NT emulation is provided by the terminal end circuitry.

Figure 8:
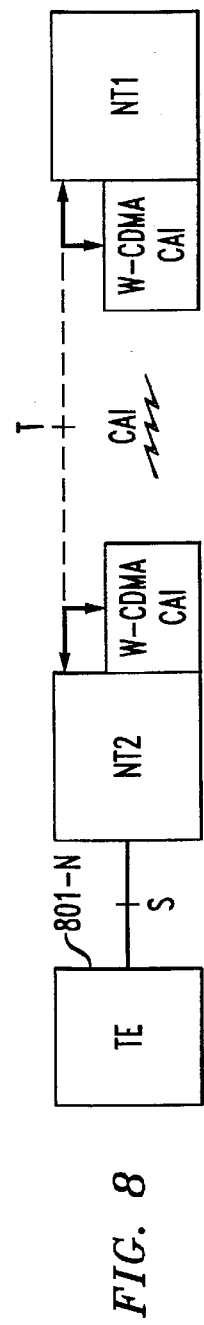
FIG. 8 is a block diagram of a similar arrangement for a customer premises having a plurality of terminal equipment devices.

An arrangement for a customer premises having more than one terminal equipment device is shown in the FIG. 8. The customer premises includes a network termination which is connected to terminal end devices 801-N.

Figure 9:
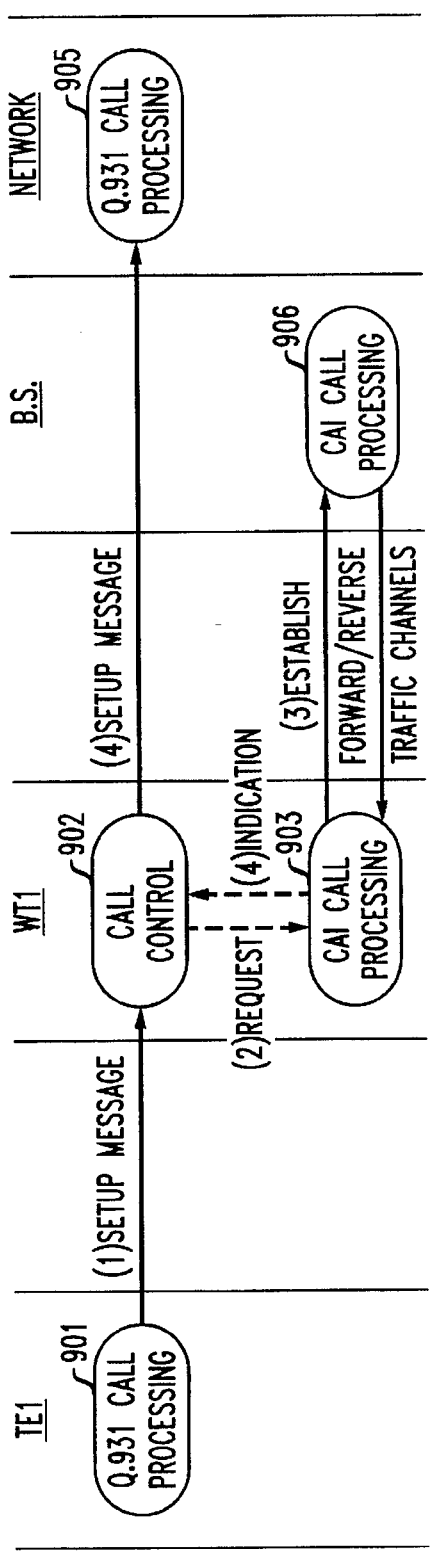
FIGS. 9 and 10 are diagrams of call set up procedures.
Figure 10:
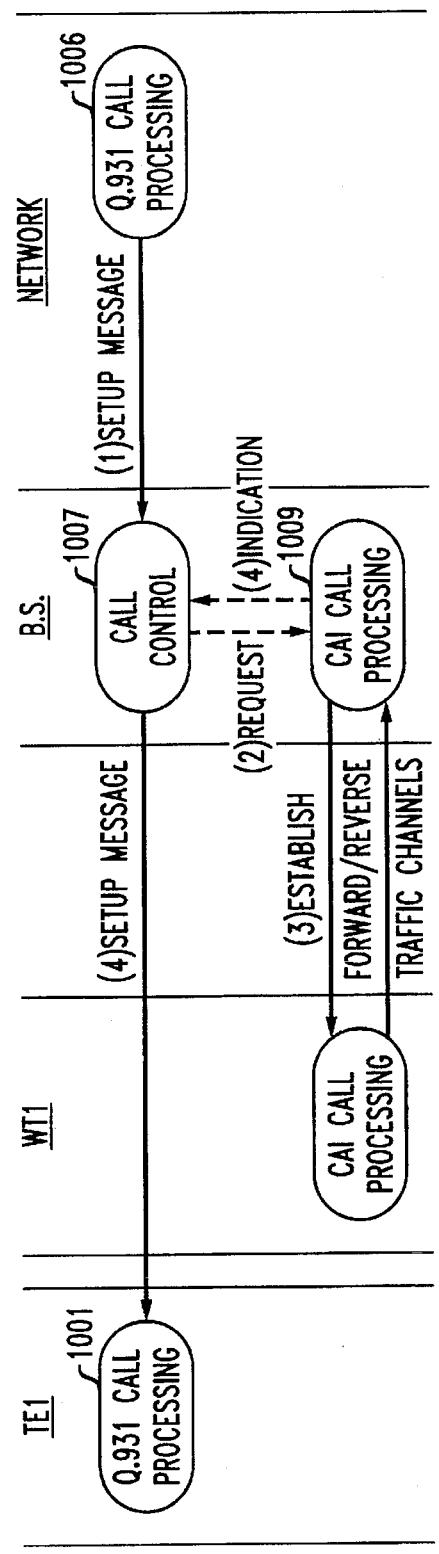

The call set-up procedures are shown in the FIGS. 9 and 10. Call set for outgoing call from the customer premises, as shown in FIG. 9, begins with call processing 901 in response to the initiating action of the caller. This is transmitted to the call control 902 at the wireless transmitter located at the customer premises. The call control 902 initially sends a set up message to a call processing unit 905 of the network. It also sends a request to the CAI (CDMA air interface) call processing unit 902 which establishes the forward and reverse traffic channels to communicate with the CAI call processing 906 located at the base station connected to the network. The call processing units 903 and 905.

A similar procedure is used to set up incoming calls to the customer premises. The call originates at the call processor 1006 connected to the network. The request is forwarded to the call control unit 1007 which communicates with the CAI call processing unit 1006. It also sends a setup message to the call processing unit 1001 at the customer premises. The call processing unit 1006 establishes the forward and reverse traffic channels with the CAI call processing unit 1001 at the customer premises location.

Figure 11:
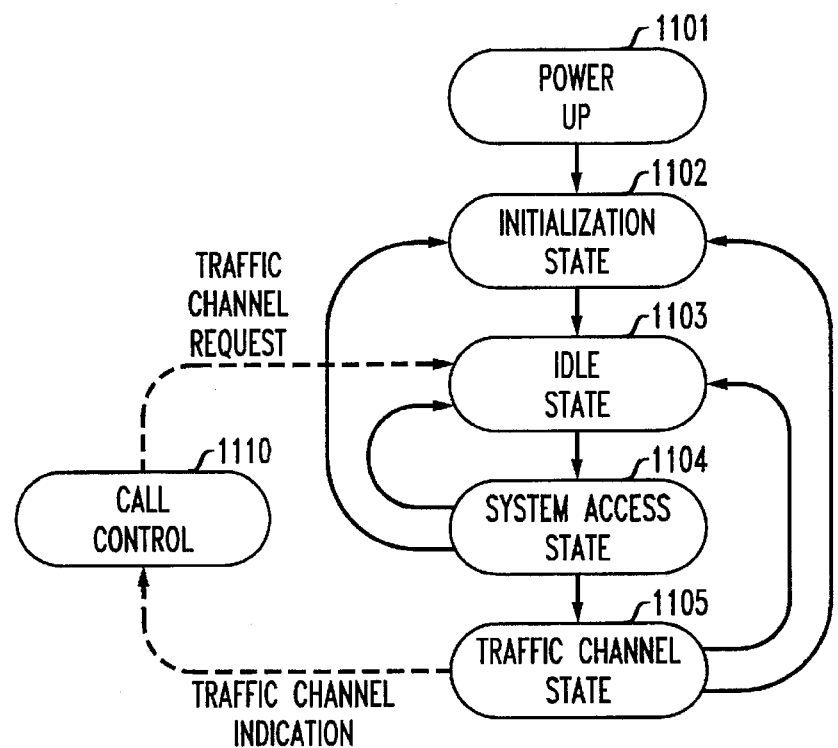
FIG. 11 is a state diagram of call processing states.
Figure 12:
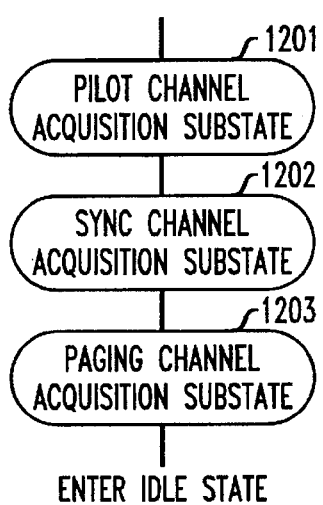
FIG. 12 is a flow chart of initialization state sub-processes.

The processing state sequence of the wireless CDMA air interface is illustrated in the FIG. 11. The initial state 1101 at power start up is followed after a successful self test by a terminal initialization state 1102, at which the fixed terminal fully acquires the system and is set up to process calls. FIG. 12 below details three subtasks of this initialization state. At the conclusion of the initialization state the wireless ISDN processor transmits to the NT a timing reference which is used to establish ISDN bit timing.

In the system access state the terminal may originate or respond to a call. This state is continued until the call termination at which the terminal idle state 1103 is entered. The system access state may proceed to the traffic channel state 1105 to direct the terminal to a traffic channel. When the terminal terminates the call the state process proceeds to either the idle or initialization state and the traffic channel is terminated.

The terminal idle state 1103 is normally followed by the system access state 1104. This system access state may return to either the terminal state 1103 or the terminal initialization state 1102. The next state following the system access state 1104 is the terminal on the traffic channel state 1105 which has return flows to either the terminal state 1103 or the terminal initialization state 1102 and to the call control 1110 for traffic control purposes.

A typical flow process in the state diagram is to have the call control 1110 access the terminal idle access state in response to a traffic channel request. The flow proceeds to the next system access state 1104 which proceeds to the terminal initialization state. This is in turn followed by the system access state 1104 and the terminal on the traffic channel state 1105. The flow returns to the call control 1110 when the traffic channel is withdrawn.

The initialization state sub processes are shown in the FIG. 12. Upon power up the state 1201 acquires a pilot channel on a selected CDMA frequency assignment. The following state 1202 acquires a sync channel to the CDMA base station and synchronizes the TE to the ISDN network. In state 1203 the paging channel is acquired and the terminal can enter the idle state.

Figure 13:
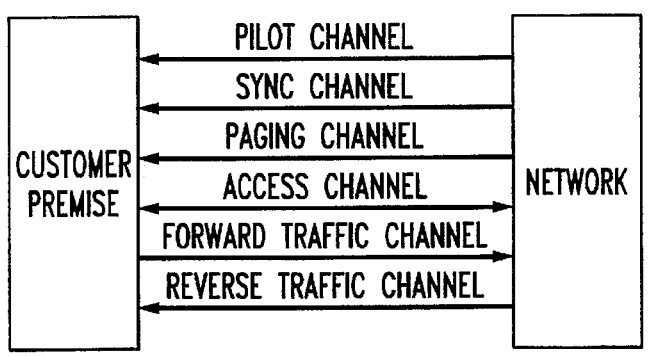
FIG. 13 is a schematic of channels interconnecting customer premises to the network.

The various channels and function in a wireless CDMA system between the network's microport and the customer premises access director are shown in the FIG. 13. The pilot performs chip synchronization for the wideband CDMA that is being used. The sync channel carries some system information and allows frame synchronization to occur. The paging channel is a low bandwidth channel that notifies a customer of an arriving call. The access channel performs call origination. The traffic channels are user voice channels.

We claim:

1. In a narrowband/broadband information distribution system for providing telephony, data and video services, system termination equipment for providing an interface between termination/origination equipment and the information distribution system via a wireless microport; comprising:

an access director for providing a wireless interface with a CDMA signal format between the termination/origination equipment and the wireless microport including:
  an antenna for radio communication with an antenna access of the wireless microport of the narrowband/broadband information distribution system;
  a duplex filter for connecting radio signal processing circuitry of the access director to the antenna for radio communication;
  the radio signal processing circuitry, connected to receive down link signals from the duplex filter, including receiving circuitry for processing down link signals having first input IF circuit for amplification, modulation and frequency modification of incoming signals to generate at least a local wireless ISDN signal having the CDMA signal format for local area service via a local antenna, a wide band signal for coaxial distribution and a second IF circuit for processing a narrowband signal for wired ISDN and tip/ting down link distribution;
  the radio signal processing circuitry, connected to provide up link signals to the duplex filter, further including transmission circuitry for processing up link signals including local wireless ISDN signals received via the local antenna, a wide band signal received from coaxial distribution and a third IF circuit for processing up link signals from wired ISDN and tip/ting up link distribution to the antenna for radio communication.

2. In a narrowband/broadband information distribution system for providing telephony, as claimed in claim 1 wherein;
the radio signal processing circuitry connected to receive down link signals being further connected to second IF circuitry connected to supply a voice signal to wired telephone terminals.

3. In a narrowband/broadband information distribution system for providing telephony, as claimed in claim 1;
the radio signal processing circuitry, connected to provide up link signals being further connected to transmission circuitry for providing uplink voice signals from wired telephone terminals to the antenna for radio communication.

4. An access director for interconnecting by wireless interface customer wireless and wired telecommunication equipment and to a network terminal wireless port of a telecommunication network; comprising:

an antenna arrangement for receiving and transmitting both broadband and narrowband RF signals;

RF processing circuitry including reception means for receiving RF signals from the antenna arrangement and separating narrowband and broadband signals;

signal output circuitry connected to the RF processing circuitry for coupling broadband and narrowband signals to customer premise equipment, the signal output circuitry including:

an output for communicating with end user wireless equipment including a customer premise signal antenna means for radiating signals and receiving signals from the wireless equipment;

an output connected for supplying broadband signals to coaxial cable connected; and means for connecting to an ISDN wired telephone including, ISDN emulation circuitry for emulating a wired connection over the wireless connection to the network by generating surrogate bit stream which is applied to the ISDN circuitry; and an output connected for supplying narrowband signals to and for receiving narrowband signals from wired customer premise equipment.

5. An access director for interconnecting by wireless interface customer wireless and wired telecommunication equipment and to a network terminal wireless port of a telecommunication network, as claimed in claim 4; further comprising:

means for providing narrowband uplink signals for interactively controlling broadband downlink services.

6. An access director for interconnecting by wireless interface customer wireless and wired telecommunication equipment and to a network terminal wireless port of a telecommunication network, as claimed in claim 5; further comprising:

an antenna for communicating by radio with a wireless port of a communication network;

radio processing circuitry connected to the antenna and including;

CDMA processing equipment to supply CDMA signals to wireless units of the customer at the same bandwidth and frequency as that transmitted by the network; and ISDN processing circuitry to enable ISDN service to wired ISDN terminals including emulation circuitry for providing a surrogate data stream to the wired ISDN terminals.

7. An access director for interconnecting customer wireless and wired telecommunication and RF wired and wireless information reception equipment to a network terminal wireless port of a telecommunication network, as claimed in claim 6, wherein:

the radio processing circuitry further including, broadband signal processing to provide broadband services, and the access director further comprising narrowband uplink circuitry for providing interactive uplink signals to the telecommunication network for interactive control.

8. An access director for interconnecting customer wireless and wired telecommunication and RF wired and wireless information reception equipment to a network terminal wireless port of a telecommunication network, as claimed in claim 6, wherein:

the emulation circuitry including a digital signal processor for generating the data bit stream in response to service request interrupts.

9. An access device located at a customer premise for enabling wireless communication with a telecommunication network in order to enable telecommunication with terminal devices locate at the customer premise;

comprising:

an antenna for wireless communication with the telecommunication network;

radio processing circuitry for processing both broadband and narrowband signals for reception and transmission;

the radio processing circuitry including:

RF circuitry for receiving and rebroadcasting wireless downlink CDMA signals;

RF circuitry for receiving and transmitting CDMA signal for transmission to the telecommunication network;

RF circuitry for receiving broadband signals and having coaxial connection to a broadband receiver;

RF circuitry for receiving and transmitting ISDN signals and including emulation circuitry for emulating an ISDN wired connection to the telecommunication network; and RF circuitry for enabling uplink interactive narrow band signals from the broadband receiver.

10. An access device located at a customer premise for enabling wireless communication with a telecommunication network in order to enable telecommunication with terminal devices locate at the customer premise, as claimed in claim 9;

wherein:

the RF circuitry for receiving and rebroadcasting connected to the antenna through a duplexer so that a single antenna serves all functions.

11. An access device located at a customer premise for enabling wireless communication with a telecommunication network in order to enable telecommunication with terminal devices locate at the customer premise, as claimed in claim 9;

wherein:

the RF circuitry for receiving and transmitting ISDN signals including a W-ISDN processor and a wired ISDN interface.

12. An access device located at a customer premise for enabling wireless communication with a telecommunication network in order to enable telecommunication with terminal devices locate at the customer premise, as claimed in claim 9;

wherein:

the RF circuitry for receiving broadband signals and having coaxial connection including a reverse channel decoder for sending uplink request signals to the telecommunication network.

13. An access device located at a customer premise for enabling wireless communication with a telecommunication network in order to enable telecommunication with terminal devices locate at the customer premise, as claimed in claim 9;

wherein:

the RF circuitry further including a tip/ring interface.

14. An access device located at a customer premise for enabling wireless communication with a telecommunication network in order to enable telecommunication with terminal devices locate at the customer premise, as claimed in claim 9;

wherein:

ISDN circuitry located in the access device including emulation circuitry for supplying a DSP with data inputs.

15. An access device located at a customer premise for enabling wireless communication with a telecommunication network in order to enable telecommunication with terminal devices locate at the customer premise, as claimed in claim 9;

wherein:

the RF circuitry for receiving and transmitting CDMA signals for transmission including an omni antenna.

16. An access device located at a customer premise for enabling wireless communication with a telecommunication network in order to enable telecommunication with terminal devices locate at the customer premise, as claimed in claim 15;

wherein:

the omni antenna being situated in a null zone to minimize interference.

* * * * *